(12) United States Patent
Becherucci et al.

(10) Patent No.: US 6,533,208 B1
(45) Date of Patent: Mar. 18, 2003

(54) WINDING CORES WITH STRATIFICATION MOTION

(75) Inventors: Raffaele Becherucci, Florence (IT); Gianfranco Stratico, Siena (IT); Vieri Ancillotti, Empoli (IT)

(73) Assignee: Axis U.S.A., Inc., Tampa, FL (US)

( * ) Notice: Subject to any disclaimer, the term of this patent is extended or adjusted under 35 U.S.C. 154(b) by 103 days.

(21) Appl. No.: 09/632,281

(22) Filed: Aug. 4, 2000

Related U.S. Application Data
(60) Provisional application No. 60/148,473, filed on Aug. 12, 1999, and provisional application No. 60/214,218, filed on Jun. 23, 2000.

(51) Int. Cl.[7] .............................................. H02K 15/085
(52) U.S. Cl. ...................................... 242/432.4; 29/596
(58) Field of Search .......................... 242/432.2, 432.4, 242/432.5, 444, 444.2, 444.3; 29/596

(56) References Cited

U.S. PATENT DOCUMENTS

| | | | | |
|---|---|---|---|---|
| 2,304,520 A | | 12/1942 | Wirtz et al. ............... | 242/1.1 R |
| 2,579,585 A | | 12/1951 | Klinksiek ................. | 242/1.1 R |
| 3,081,043 A | * | 3/1963 | Morrill .................... | 242/432.4 |
| 3,411,725 A | | 11/1968 | Biddison ................. | 242/101 R |
| 4,392,506 A | * | 7/1983 | Tanaka et al. ............. | 134/46 |
| 4,601,213 A | * | 7/1986 | Kimball .................. | 242/432.4 |
| 4,641,542 A | * | 2/1987 | Kamei .................... | 242/432.4 |
| 4,762,283 A | | 8/1988 | Sabatino .................. | 242/1.1 R |
| 4,991,782 A | * | 2/1991 | Luciani ................... | 242/432.4 |
| 5,065,503 A | * | 11/1991 | Luciani et al. .............. | 29/735 |
| 5,164,772 A | * | 11/1992 | Andoh .................... | 355/233 |
| 5,245,749 A | * | 9/1993 | Luciani et al. .............. | 29/735 |
| 5,273,223 A | * | 12/1993 | Tsugawa .................. | 242/432.4 |
| 5,413,289 A | * | 5/1995 | Santandrea et al. ......... | 242/433 |
| 5,596,796 A | * | 1/1997 | Ruoss ..................... | 242/432.2 |
| 5,810,278 A | * | 9/1998 | Ruoss ..................... | 242/432.5 |
| 5,964,429 A | * | 10/1999 | Burch et al. .............. | 242/432.2 |
| 6,098,912 A | * | 8/2000 | Noji ....................... | 242/432.5 |
| 6,254,027 B1 | * | 7/2001 | Kunou .................... | 242/432.4 |

FOREIGN PATENT DOCUMENTS

| | | |
|---|---|---|
| FR | 2 514 211 | 4/1983 |
| GB | 2 068 787 A | 8/1981 |

\* cited by examiner

*Primary Examiner*—Emmanuel Marcelo
(74) *Attorney, Agent, or Firm*—Fish & Neave; Joel Weiss; Jeffrey C. Aldridge (57) ABSTRACT

A winder and system for winding wire onto core supports of dynamo-electric cores with translational, rotational and radial motions with respect to a central longitudinal axis of the dynamo-electric core is provided. The radial motion may preferably be provided by an independent assembly. In one embodiment of the invention, the radial motion may be provided by rotating a cam disk which is movably connected to, and causes radial motion of, a pair of rollers. The pair of rollers are mounted on support arms which are connected to a needle for dispensing the wire such that movement of the pair causes similar movement of The needle. In another embodiment of the invention, an inclined way is coupled to a slide portion of the needle. When the inclined way is moved parallel to the axis, it causes a radial motion of the slide portion.

31 Claims, 11 Drawing Sheets

WINDING CORES WITH STRATIFICATION MOTION

CROSS-REFERENCES TO RELATED APPLICATIONS

This application claims priority from U.S. Provisional Applications No. 60/148,473, filed Aug. 12, 1999, and No. 60/214,218, filed Jun. 23, 2000.

BACKGROUND OF THE INVENTION

The present application relates to winding coils of wire onto poles of dynamo-electric cores. More particularly, the coils are wound directly into the slots of cores by means of needles which dispense wires. The wires are each drawn from tensioners.

During winding, relative motions occur between the needles and the core in order to deliver the wires and wind them around the poles. The shapes of the slots are defined by the contours of the poles. Such motions are similar to those described in commonly-assigned U.S. Pat. No. 5,413,289. The '289 patent, and any other patents mentioned herein, is hereby incorporated herein in its entirety.

It would be desirable to provide a winding apparatus capable of rotational and translational movements with respect to the core while stratifying the wire along the poles of the core.

SUMMARY OF THE INVENTION

Therefore, it is an object of the invention to Provide a winding apparatus preferably capable of rotational, translational and radial movements with respect to the poles of the core. This stratification movement can be considered to be a radial movement that moves the winding needle along the radial extension of the poles. This stratification allows for pre-determined placement of the wire. Pre-determined placement of the wire preferably results in deeper and denser winding of wire.

A winder for winding wires onto a coil support portion of a dynamo-electric core is provided. The winder has a central longitudinal axis and includes a plurality of needles, each needle for dispensing a wire, a plurality of support members, each member supporting a single one of the plurality of needles, a first assembly for producing translational movement of the members along the axis, a second assembly for producing relative rotational movement of the plurality of members with respect to the core, and a third assembly for producing radial movement of each of the members perpendicular to the axis. The operation of the third assembly is substantially independent of the operation of the second assembly.

In another embodiment of the invention, the winder includes a single needle for dispensing the wire and a first assembly, the first assembly including a winding shaft. The needle is preferably constrained to move translationally with the shaft. The first assembly is for producing translational movement of the shaft along the axis. The winder also includes a second assembly for producing rotational movement of the needle about the axis and a third assembly including a drive member movably coupled to the winding shaft. Furthermore, relative rotation between the drive member and the winding shaft produces radial movement of the needle. In addition, the third assembly produces radial movement substantially independently of the rotational movement provided by the second assembly.

BRIEF DESCRIPTION OF THE DRAWINGS

The above and other objects and advantages of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
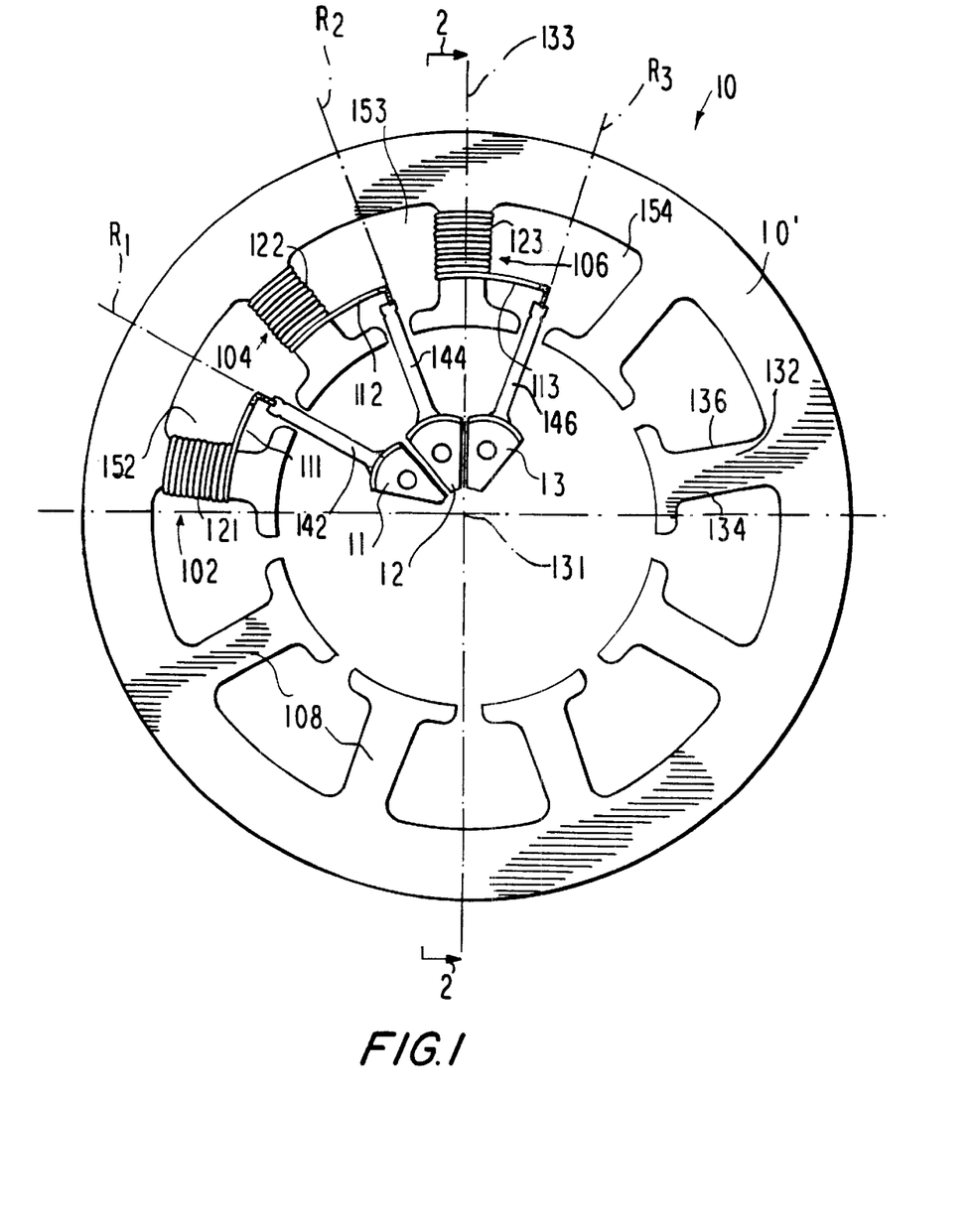
FIG. 1 is an axial view of a core being wound according to the invention.

A typical core 10 wound according to the principles of the present invention is illustrated in FIG. 1. FIG. 1 illustrates an axial end 10' of core 10. Core 10 includes a pile of laminated portions, having an axial configuration like 10', stacked for a certain length into the page. (Reference to the "page" as used herein indicates the plane of the drawing page of the FIGS.). Such a length is often referred to as the "height of the core".

The actual coils 102, 104 and 106 are wound around poles 108, by using needles 11, 12, and 13 which dispense wires 111, 112 and 113, respectively, onto specific poles, as illustrated in FIG. 1.

The wire turns 121, 122 and 123 of the coils become stratified along poles 108. This means that each wire turn tends to occupy an individual layer along the poles. In FIG. 1 the turns are illustrated crossing the end faces, similar to end face 132, of the poles. The stratification shown in FIG. 1 is such that the turns are preferably wound on layers progressing inwardly towards the center of core 10—i.e., at longitudinal axis 131. Each turn is also preferably wound around the pole sides similar to sides 134 and 136, and across opposite faces similar to face 132.

To begin wending of the coils shown in FIG. 1, needles 11, 12, and 13 are provided with translation strokes, parallel to sides 134 and 136, and into the page. During these strokes, the needle tips 142, 144 and 146 are partially inserted in slots 152, 153 and 154 of core 10 to place the wires along the respective pole sides. At the end of the translation strokes, needle tips 142, 144 and 146 are located beyond the end faces of core 10.

At this point, needles 11, 12 and 13 can be rotated with respect to longitudinal axis 131 of core 10, in order to place the wires across the end faces of the poles. It should be noted that, for the purpose of the embodiment described in FIGS. 1–8, the term rotational movement preferably indicates that the core may be rotated around longitudinal axis 131, while the needles remain stationary. At the end of the rotations, needle tips 142, 144 and 146 may be aligned with adjacent slots, where they can start opposite translation strokes. Similarly to the original translation strokes, needles 11, 12 and 13 accomplish opposite translation strokes with their tips partially inserted in the adjacent slots of the core in order to place the wires along the nearby pole sides. Hollowing the opposite strokes, tips 142, 144 and 146 are located beyond the end faces of the core, and out of the page. Then, an opposite rotation can take place to align the tips with the slot where the motions started.

Such a combination of motions places single turns of coils, such as coils 102, 104 and 106, completely around the poles. The combination of motions needs to be repeated for a number of times equal to the number of turns. Furthermore, the combination of motions also must be repeated for the number of layers of turns that are wound around the poles. The stratification of the turns shown in FIG. 1 can be implemented by moving the needles along radiuses R1, R2 and R3 (respectively for needles 11, 12 and 13) of core 10. The movements along the radiuses preferably occur incrementally along the radius length. The incremental movement can be implemented at the start of each new turn.

Suitable criteria that can dictate when the needle should be moved along the radii, and how long the increments should be include the thickness of the wire, the dimensions and winding requirements of the poles, etc. A correctly obtained stratification is of great importance for guaranteeing that the turns are tightly wound, and of the same length. Orderly stratification of the wires achieves more compact coils, which ultimately means that more turns can be wound in the same slot space, while preventing turns of adjacent poles from interfering with each other.

The present invention provides a machine which achieves such a stratification. Furthermore, the machine of the present invention is able to have multiple needles accomplish stratification, substantially simultaneously, along respective poles. This achievement is made possible even for poles which are at a close angular distance from each other around the center of core 10.

In addition, the machine is programmable so that the stratification can be achieved in a variable and predetermined manner, depending on the requirements of the core and the coils which need to be wound.

As shown in FIG. 1, coils 102, 104 and 106 can be simultaneously wound by using respective and separate needles for each pole. The motions of the needles can also preferably be synchronized with respect to each other. Winding multiple coils, by means of a plurality of needles operating substantially simultaneously, reduces the time required to wind the totality of coils present in the core. As illustrated in FIG. 1, the shape of the needles is preferably a "V" configuration at the needle base because of the relatively small angular spacing made available by the distance existing between the poles.

Figure 2:
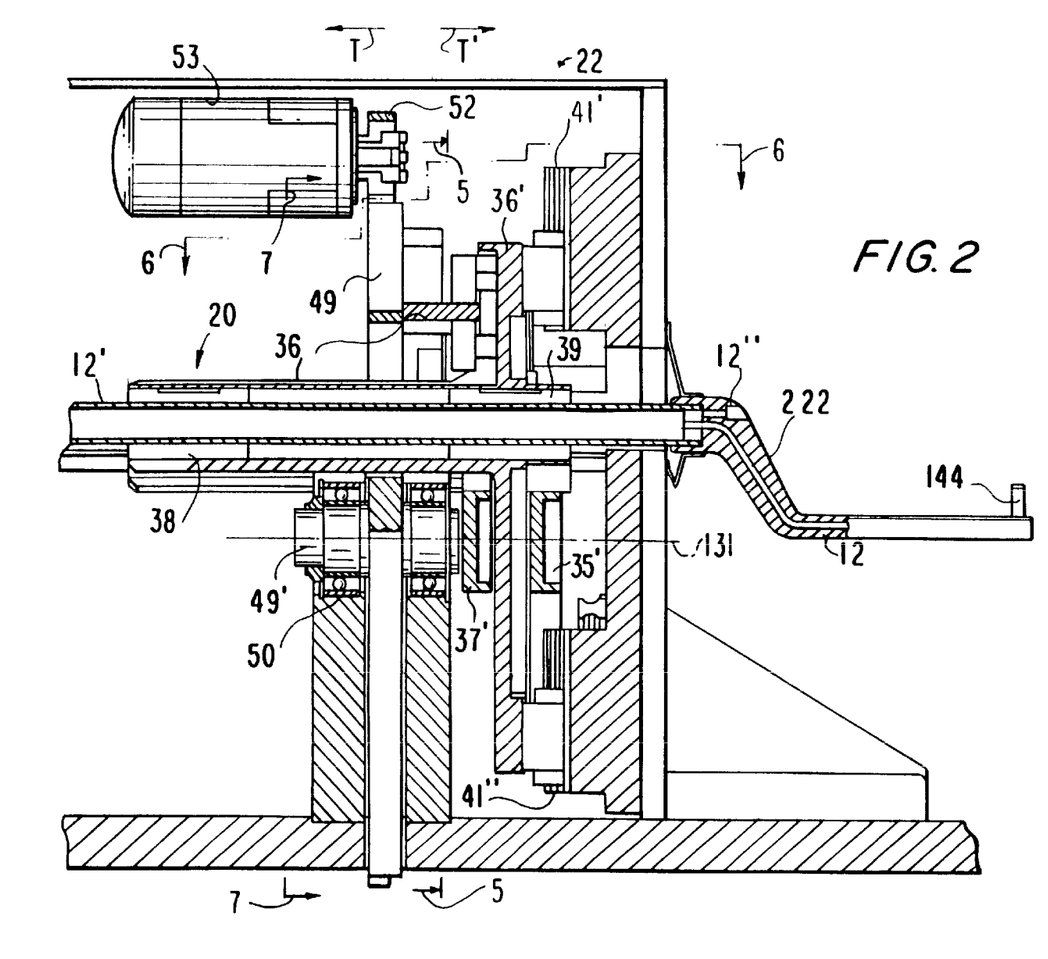
FIG. 2 is a partial sectional view of an embodiment of a winder according to the invention.
Figure 2A:
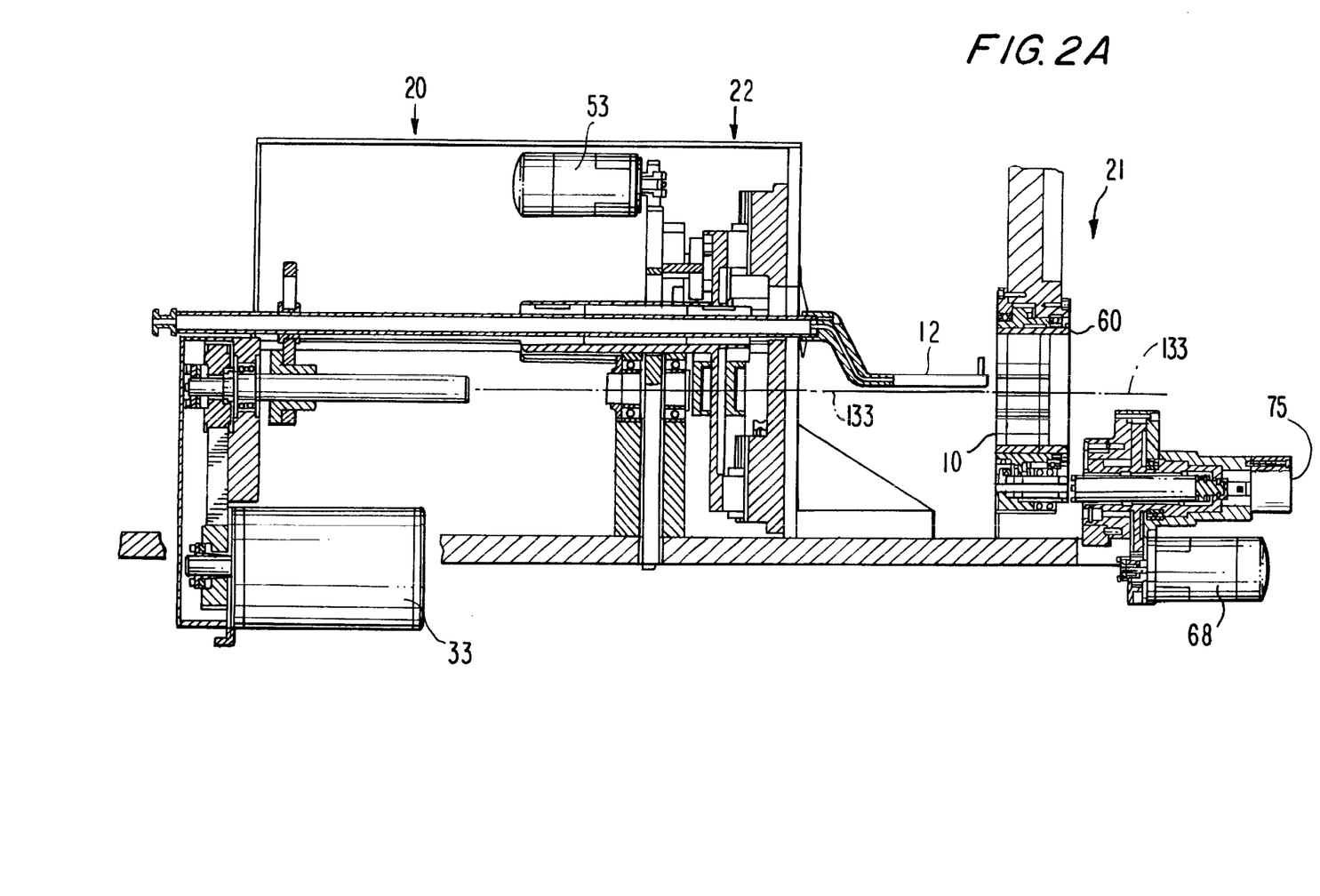
FIG. 2a is a full sectional view of an embodiment of a winder according to the invention.
Figure 3:
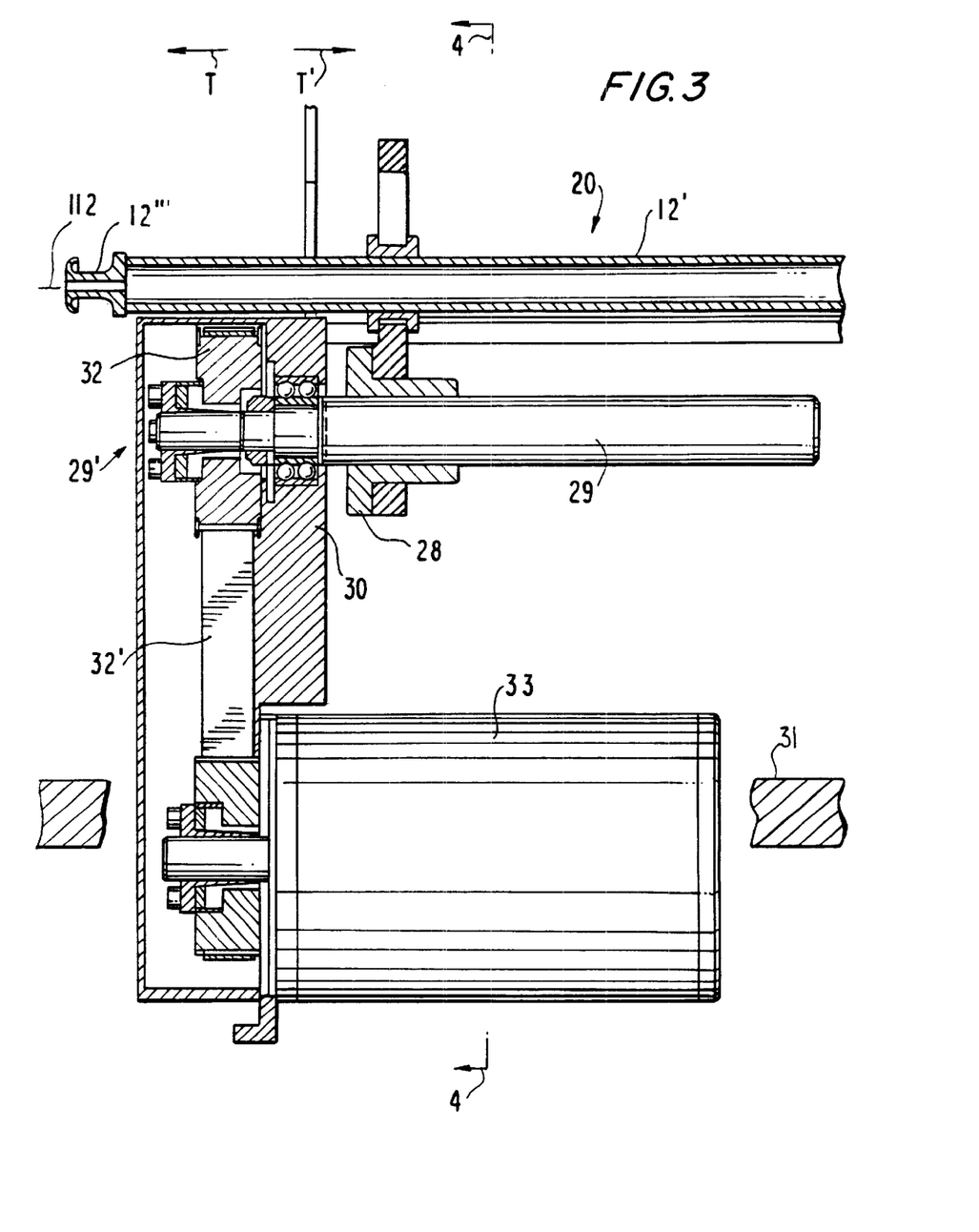
FIG. 3 is another partial sectional view of an embodiment of a winder according to the invention.

FIG. 2 is a partial section view as seen from direction 2—2 of FIG. 1, showing the apparatus of this invention for causing the needles to move with translational, rotational and radial—i.e., stratification—motions. FIG. 2A shows a sectional view of the entire assembly 20. FIG. 3 is a section view similar to FIG. 2 and represents a continuation of FIG. 2 (towards the left of the page containing FIG. 2).

Figure 4:
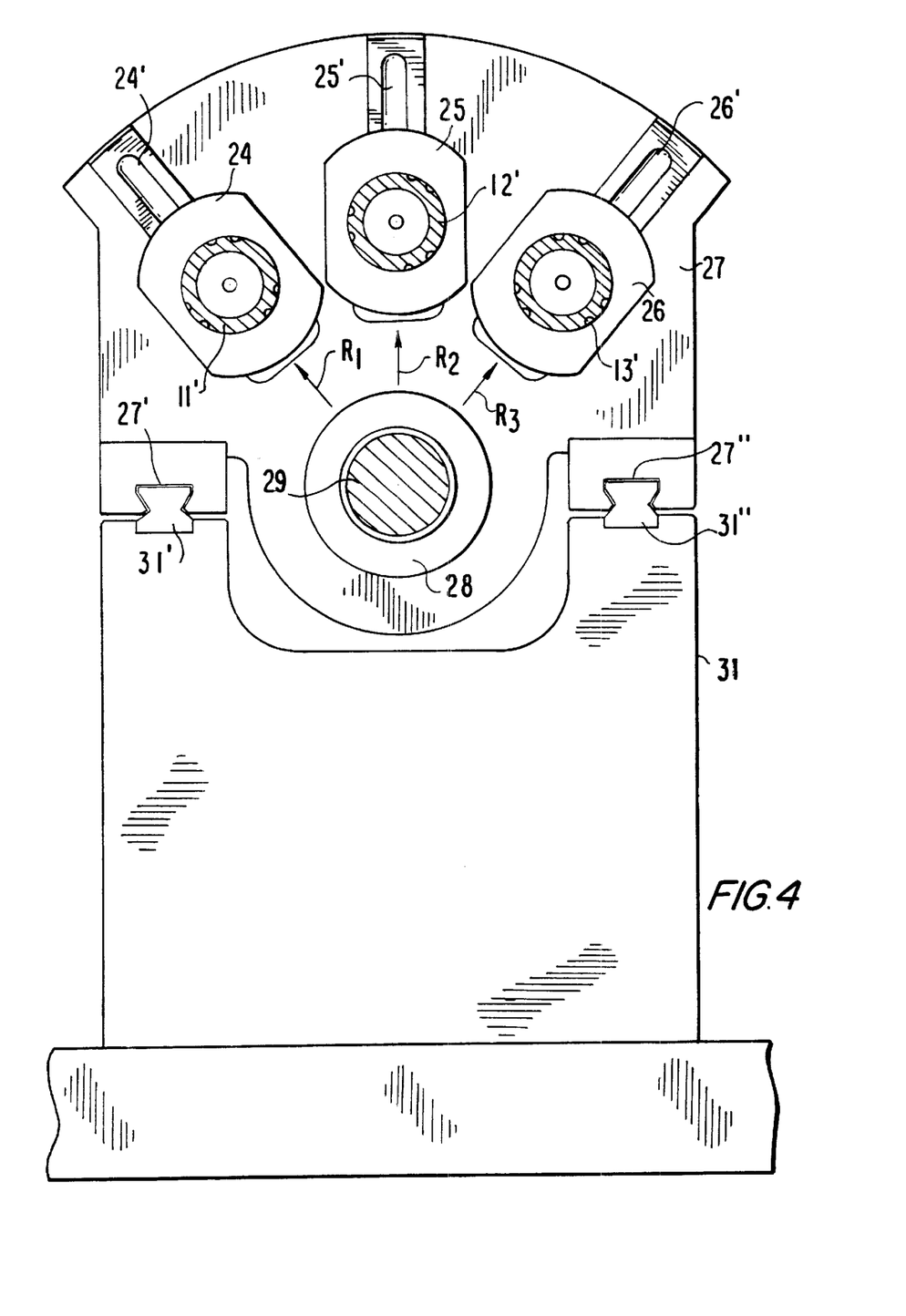
FIG. 4 is a view from direction 4—4 of FIG. 3 of a portion of the embodiment shown in FIG. 3.

Furthermore, FIG. 3 shows the completion of assembly 20. FIG. 4 is a view from direction 4—4 of FIG. 3. Assembly 20 is partially visible in FIG. 2.

In FIG. 2, core 10 and the needles of FIG. 1 have been rotated to bring needle 12 on axis 131. Three distinct assemblies 20 (shown in FIG. 3), 21 (shown in FIG. 2a) and 22 respectively generate the translation strokes, relative rotation motions and the radial increments for winding of the turns. Each of the assemblies preferably provides for the independent operation of each other assembly.

Assembly 20 comprises three tubes 11', 12' and 13' carrying needles 11, 12 and 13, respectively. FIG. 2 illustrates the connection of needle 12 (in partial sect on view) to tube 12', by means of bolt 12" screwed into an end cap of tube 12'. These tubes act as support members for the needles. Tip 144 of needle 12, which is perpendicular to the length of needle 12, is clearly visible in FIG. 2. Needles 11 and 13 will be connected in a similar manner to tubes 11' and 13'. To avoid complicating FIG. 2, needles 11 and 13 (which are out of the plane of FIG. 2) have been omitted from FIG. 2.

Wires 111, 112 and 113 are threaded through tne respective needles to reach the core as shown in FIG. 1. Wires come from a respective supply reel placed to the left of FIG. 3 and enter the tubes through nozzles like 12''', shown for tube 12' in FIG. 3. To position the tips—e.g., tip 144—with respect to core 10 as shown in FIG. 1, needles are provided with bent portions—e.g., bent portion 222 shown in FIG. 2.

The following discussion relates to tube 12' shown in FIGS. 2 and 3 but also is extended to tubes 11' and 13', though they are not shown in FIG. 3. Each of tubes 11', 12' and 13' are connected to slide members 24, 25 and 26, respectively. Slide members 24, 25 and 26 have narrow portions which are guided to move in radial directions RI, R2 and R3, respectively, by means of respective slots 24', 25' and 26'. These slots are preferably machined in upstanding plate 27.

Upstanding plate 27 is preferably bolted to threaded sleeve 28 by means of bolts (not shown).

Plate 27 is provided with dovetail recesses 27' and 27" that receive corresponding guide male portions 31' and 31" of a bench portion of casing 31. This configuration allows plate 27 to translate in directions T and T', parallel to axis 131. (A portion of plate 27, as well as the bench portion of casing 31 has been omitted for the sake of clarity.) Sleeve 28 is threaded onto threaded bar 29, which, in turn, is supported on bearing support 30 of casing 31 (see FIG. 3). End 29' of threaded bar 29 carries pulley 32 of belt transmission 32', which leads to electric motor 33. Electric motor 33 can be controlled to turn threaded bar 29 for a predetermined number of revolutions. The result will be translation of upstanding plate 27, and consequently of tubes 11', 12', and 13' in directions T and T' for pre-determined stroke lengths.

Figure 5:
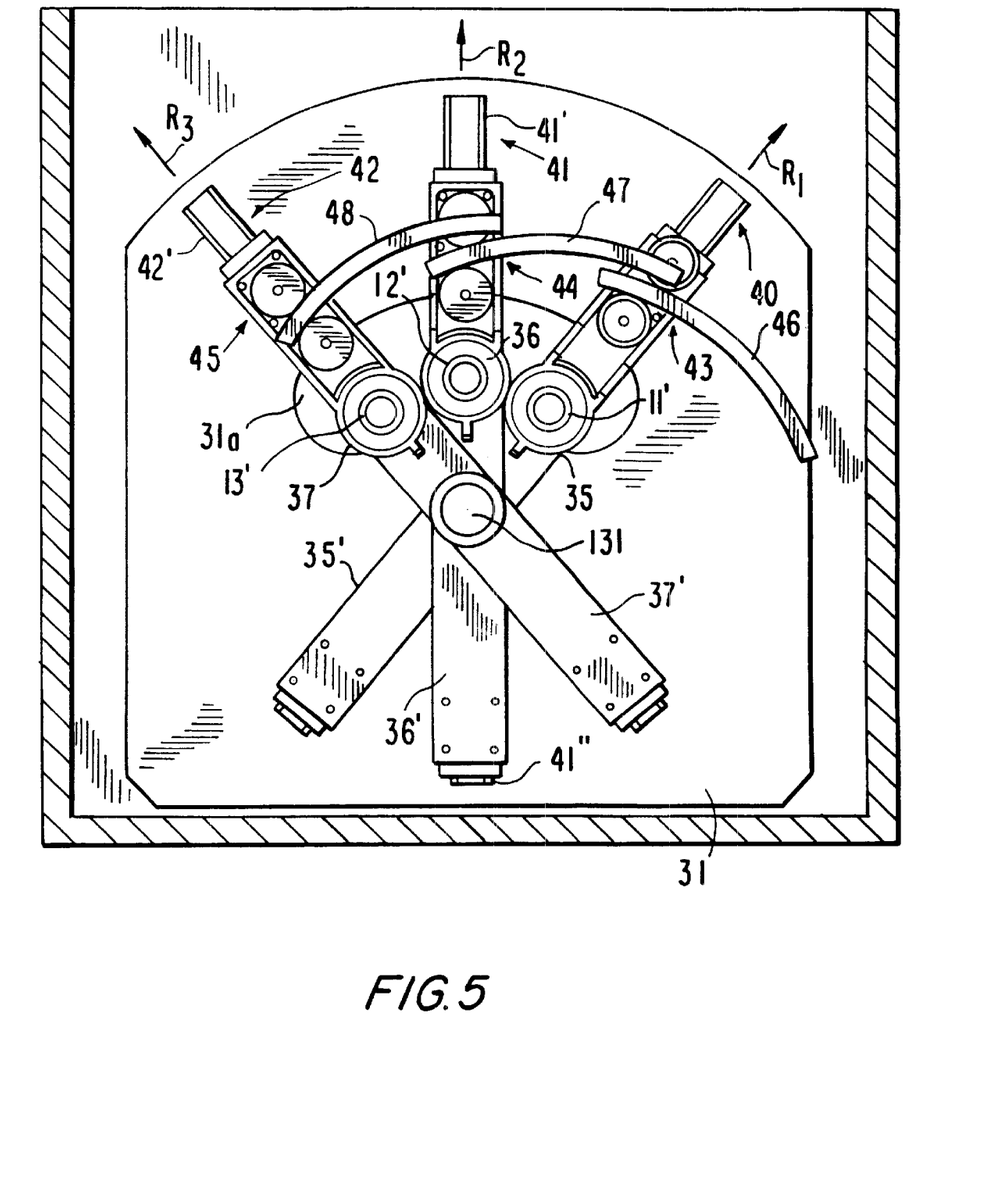
FIG. 5 is a view from direction 5—5 of FIG. 2 of a portion of the embodiment shown in FIG. 2.

Assembly 22, for obtaining the stratification motion is illustrated in FIGS. 2, 5, 6 and 7. FIG. 5 is a partial section view from directions 5—5 of FIG. 2. Tubes 11', 12' and 13' are supported in preferably cylindrical guide sleeves 35, 36 and 37, respectively. Tubes 11', 12' and 13' are carried by bushes—e.g., bushes 38 and 39 of guide sleeve 35, which support tube 12', as shown in FIG. 2. The bushes allow the tubes to translate in directions T and T', within guide sleeves 35, 36 and 37, when upstanding plate 27 is moved backwards and forwards by electric motor 33. Guide sleeves 35, 36 and 37 are parts of support arms 35', 36' and 37', respectively.

Figure 6:
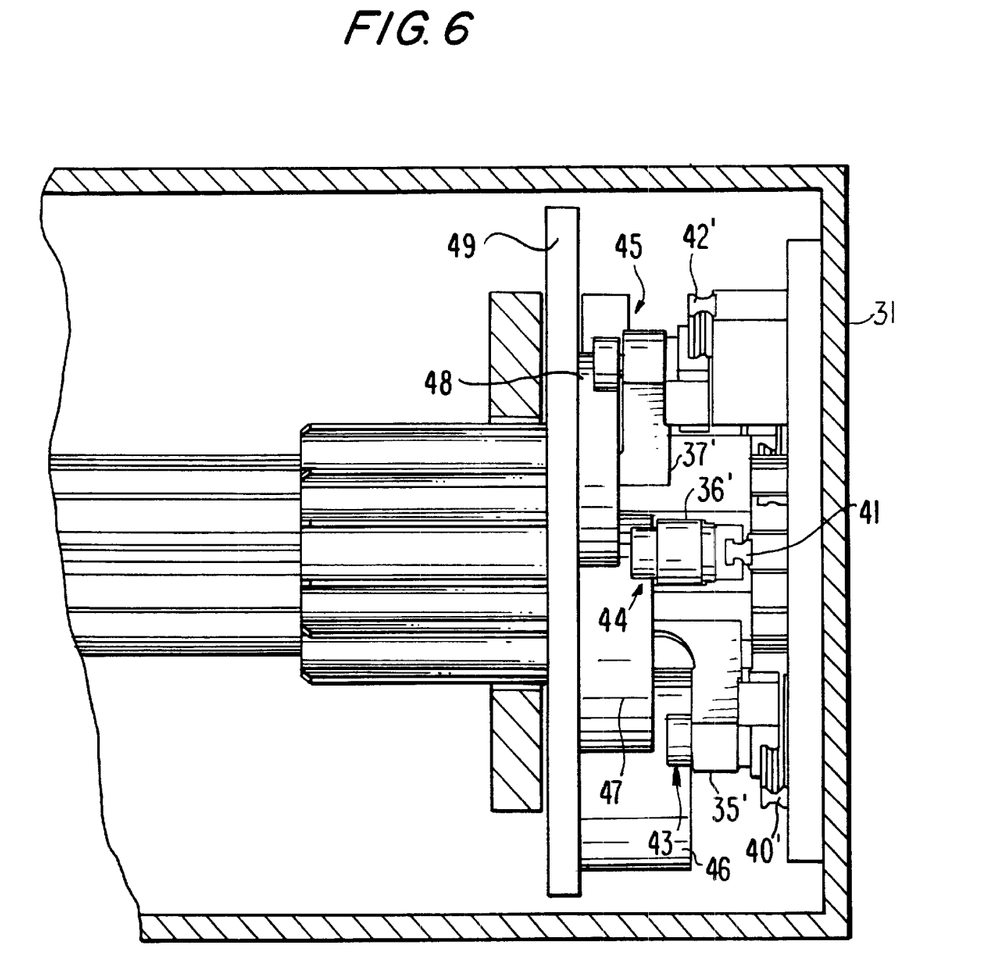
FIG. 6 is a view from direction 6—6 of FIG. 2 of the embodiment shown in FIG. 2.

As shown in FIGS. 2, 5 and 6, support arms 35', 36' and 37' are contained in different, although parallel, planes with respect to the plane of the page in FIG. 5. Furthermore, 35', 36' and 37' cross each other as shown in FIG. 5. Support arms 35', 36' and 37' can move along radii R1, R2 and R3 to accomplish the radial motion required for stratification by being supported respectively on respective guide tracks 40, 41 and 42. Preferably, the radial movement of each of the support arms occurs substantially simultaneously. The guide tracks consist of opposite portions—e.g., 41' and 41" of glide track 41—extending along radii R1, R2 and R3. The guide tracks are assembled to an upright portion of casing 31. Their opposite portions—e.g., 411 and 41" of guide track 41 (as also shown in FIG. 2)—are or respective sides of aperture 31a of casing 31. Aperture 31a provides for passage of guide sleeves 35, 36 and 37. The size of the aperture should preferably allow the movement of guide sleeves 35, 36 and 37 along radiuses R1, R2 and R3 during the radial—e.g., stratification—motion. Guide tracks 40, 41, and 42 are also located on different, but parallel planes with respect to each other and with respect to the page of FIG. 5 (and as shown in FIG. 1), in order to conform to the planes containing support arms 35', 36' and 37'.

FIG. 6 is a view from direction 6—6 of FIG. 2 showing guide portions 40', 41' and 42' of guide tracks 40, 41 and 42 in perspective view, contained in their respective and different planes.

Support arms 35', 36' and 37' include pairs of rollers 43, 44, and 45, respectively, for movably connecting to biting cam members 46, 47 and 48, respectively.

Figure 7:
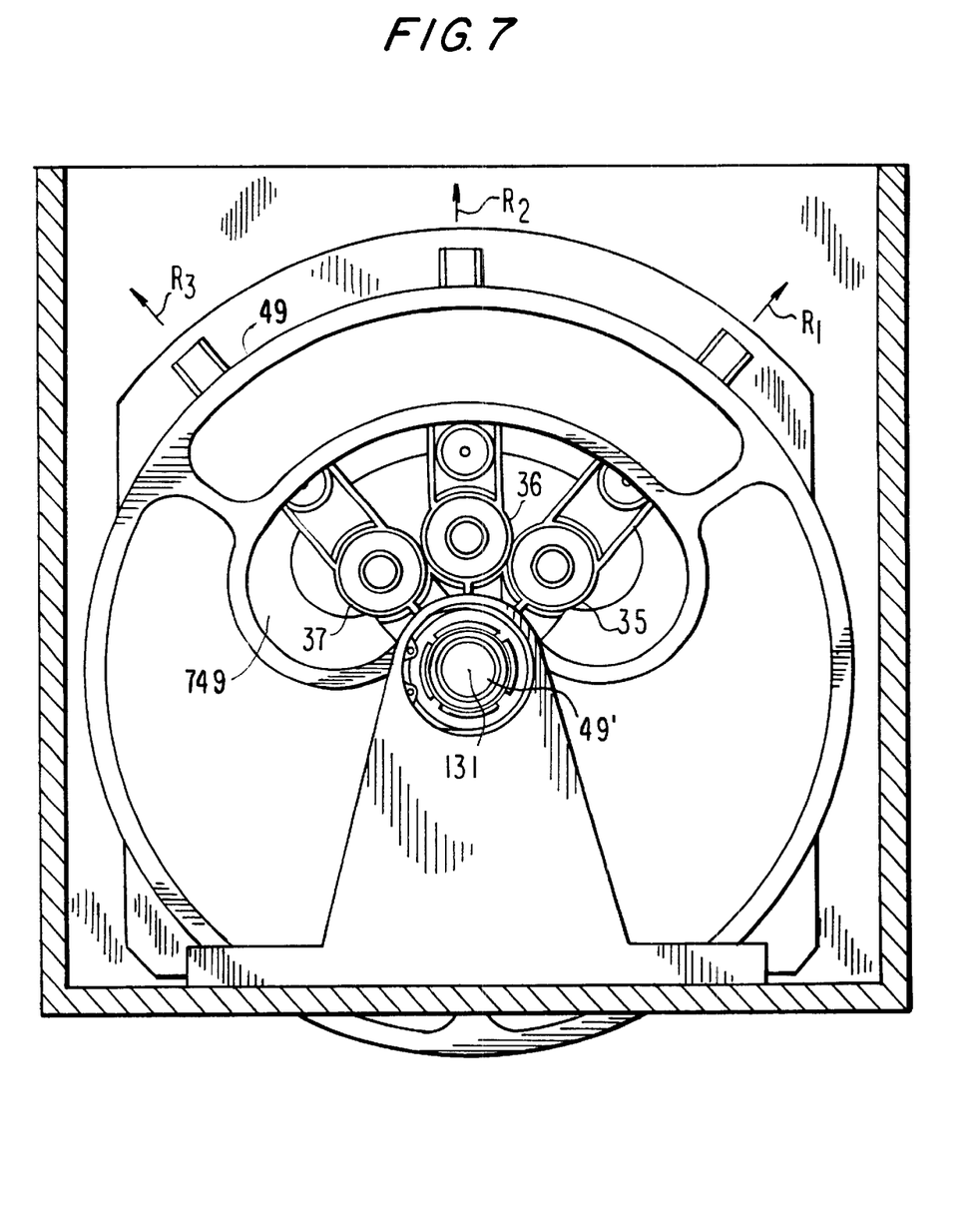
FIG. 7 is a view from direction 7—7 of FIG. 2 of a portion of the embodiment shown in FIG. 2.

FIG. 7 is a view from direction 7—7 of FIG. 2. Cam disk 49 is shown in FIGS. 2, 6 and 7.

As shown in FIG. 6, cam members 46, 47 and 48 have different and respective extensions from cam disk 49 in order to reach pairs of rollers pairs of rollers 43, 44, and 45.

Cam disk 49 is supported by shaft 49' on bearing assembly 50 of casing 31. Bearing assembly 50 allows cam disk 49 to rotate around axis 131. Cam disk 49 preferably is provided with a gear profile on its outer circumference, which meshes with pinion gear 52 or electric motor 53. Electric motor 53 is preferably supported by casing 31. In addition, cam disk 49 is provided with an aperture 749 to allow passage of guide sleeves 35, 36 and 37. Again, the size of aperture 749 should preferably provide for clearance with respect to movement of guide sleeves 35, 36 and 37 along radiuses R1, R2 and R3 during the radial—i.e., stratification—motion.

Figure 8:
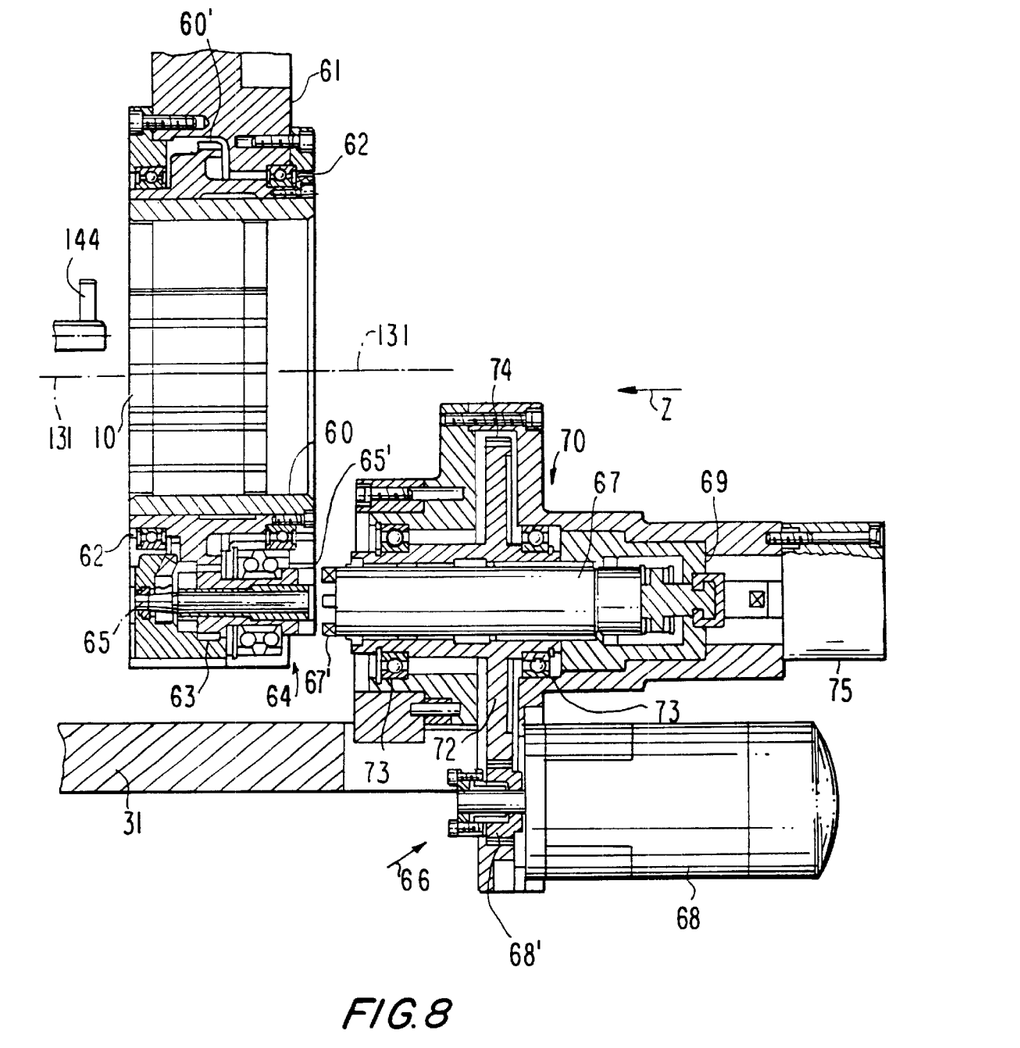
FIG. 8 is another partial section view of an embodiment of a winder according to the invention.

FIG. 8 shows a continuation towards the right of FIG. 2. FIG. 8 shows core 10, which is being wound. Core 10 can be supported in core casing 60 of a vertical round table 61. FIG. 8 also illustrates assembly 21. Assembly 21 preferably accomplishes the relative rotation motions.

Core casing 60 preferably maintains core 10 centered on axis 131 of casing 31. This centers radii R1, R2 and R3 of core 10 on axis 131, as shown in the previous FIGS. Bearings 62 of round table 61 supports core casing 60 for rotation around axis 131. In this way, core 10 can rotate around axis 131 of casing 31 to provide the required relative rotation motions between the needles and the core, as described in the foregoing.

The rotations are preferably imparted to core 10 casing by gear 63, which meshes with gear portion 60' provided on the external surface of core casing 60. Gear 63 is supported and allowed to rotate by shaft/bearing assembly 64, assembled on round cable 61. Assembly 64 is located adjacent to core casing 60. Shaft 65 of shaft/bearing assembly 64 is provided with a key portion 65' which can be aligned (by rotation of round table 61) and connected to drive unit 66 of casing 31.

Drive unit 66 preferably includes a shaft 67 driven by electric motor 68. Forward end 67' of shaft 67 has a corresponding key portion capable of connecting itself to key portion 65'. This connection occurs by shifting shaft 67 in direction Z, using air cylinder 75, which is connected to the other end of shaft 67 by means of fork joint 69.

Shaft 67 is supported for rotation by means of support/bearing assembly 70. This support/bearing assembly comprises bushes for supporting movement of shaft 67 caused by air cylinder 75. The bushes are supported in gear tube 72, which is supported for rotation by means of bearings 73. Shaft 67 has key portions received in gear tube 72, for transmission of relative rotations between gear tube 72 and shaft 67. Gear portion 74 of gear tube 72 meshes with pinion 68' of electric motor 68. Rotation of electric motor 68 rotates shaft 67 which, in turn, causes core 10 to have the relative rotation motions with respect to needles 11, 12 and 13 around axis 131. Motor 68 can also be used to index the core when unwound poles need to be aligned with the needles.

Motors 33, 58 and 68 can be provided with position and speed feedback sensors. Such a combination allows computer equipment (see computer 960 in FIG. 9) to control the motors so that they achieve predetermined and programmable revolutions of rotation.

Thus, the needles may have relative motions of translation, rotation and stratification (described in the foregoing with reference to FIG. 1), occurring in required timing and synchronized between each other. A main computer (see computer 960 in FIG. 9) required to govern such a performance can contain the relative programs and data. Position control principles like those described in the '289 patent can be used to obtain accurate predetermined trajectories of The needles with respect to the poles. The same computer, or a different computer, can be provided with different data when the amounts of the motions and the relative timing need to be modified—e.g., when a different type of core needs to have winding conditions set—i.e., requiring different translations, rotations and radial.

It should be noted that the profile of the cam members govern the stratification motion of the needles, although the programmable revolutions of motor 53 also influence the relative timing and speed or the needles. The cam members can be dismounted and substituted with others when a different motion is required.

It should also be noted that round table 62 can have multiple core casings carrying respective cores, each provided with a shaft/bearing assembly—e.g., shaft/bearing assembly 64. In this way, cores can be fed rapidly, and in sequence, to the needles in order to be wound. In such a situation, a core casing having a core which has already been wound can align itself with another axis, where termination of the coil leads can take place by means of equipment like the one described in commonly-assigned U.S. Pat. Nos. 5,065,503, 5,245,748, and 5,392,506. It should be noted that all patents mentioned herein are incorporated by reference in their entirety.

Another advantage of the embodiment described with relation to FIGS. 1–8 is that the equipment for accomplishing the various relative motions is preferably substantially independent—i.e., each assembly for accomplishing a particular motion is substantially physically separate from each other assembly and each assembly is capable of providing the particular motion for which it is responsible without causing the other motions to occur. For example, substantially none of the equipment—e.g., the motor—used to cause the radial motion moves with the equipment which translates. Thus, the motor that provides the radial movement may be substantially static—i.e., the motor preferably does not translate—when the translational motion occurs. This makes the translation equipment lighter, which, in turn, provides higher translation speeds without causing high levels of problematic vibrations. In addition, the stratification equipment has been conceived to move needles very close to each other (as shown in FIG. 1), as is the constraint given by the small angular distance existing between the poles.

Figures 9, 11:
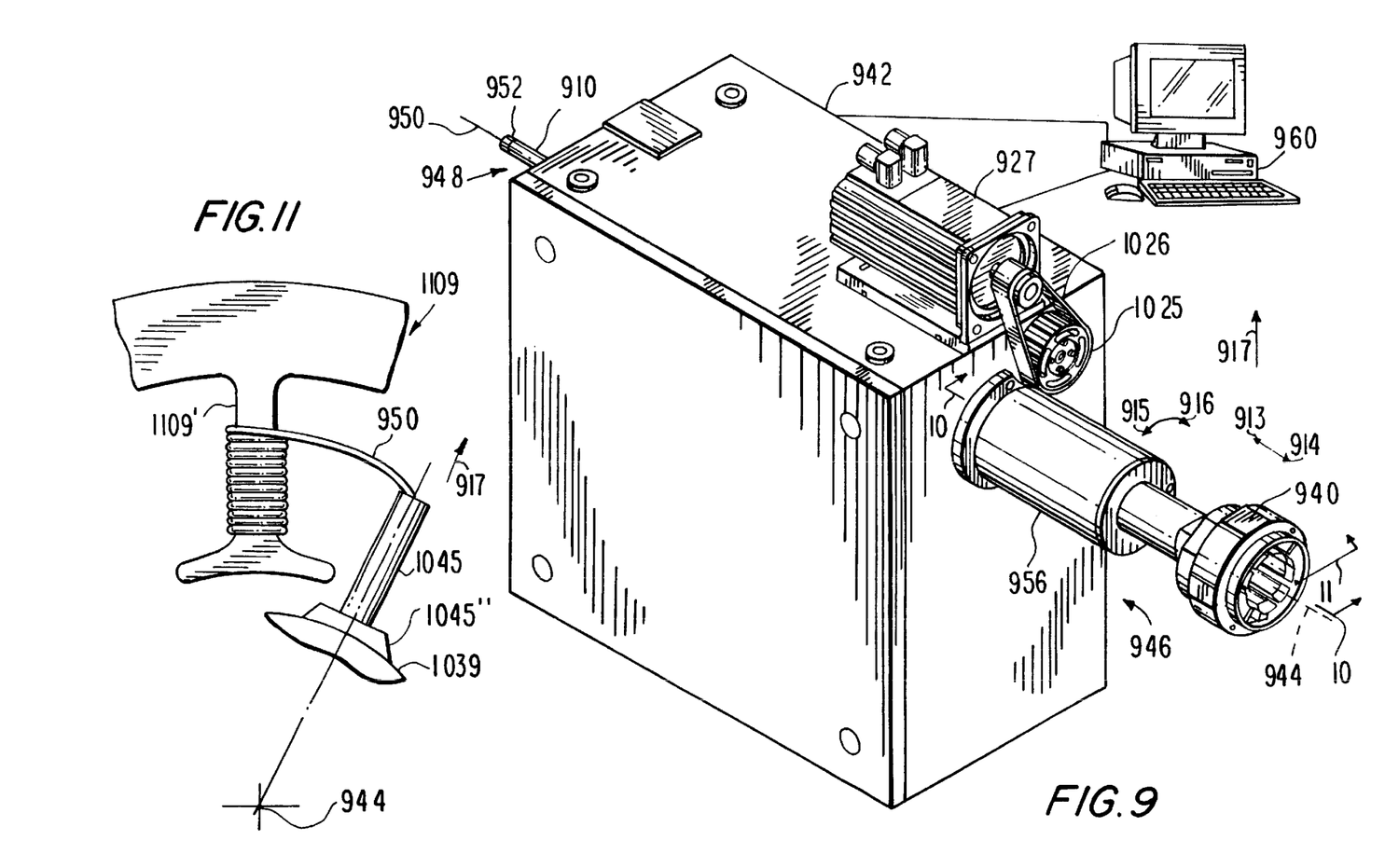
FIG. 9 is an elevational view of an embodiment of a winder according to the invention.
FIG. 11 is a partial sectional view taken from direction 11—11 of FIG. 9 of a portion of the winder and core according to the invention.
Figure 10:
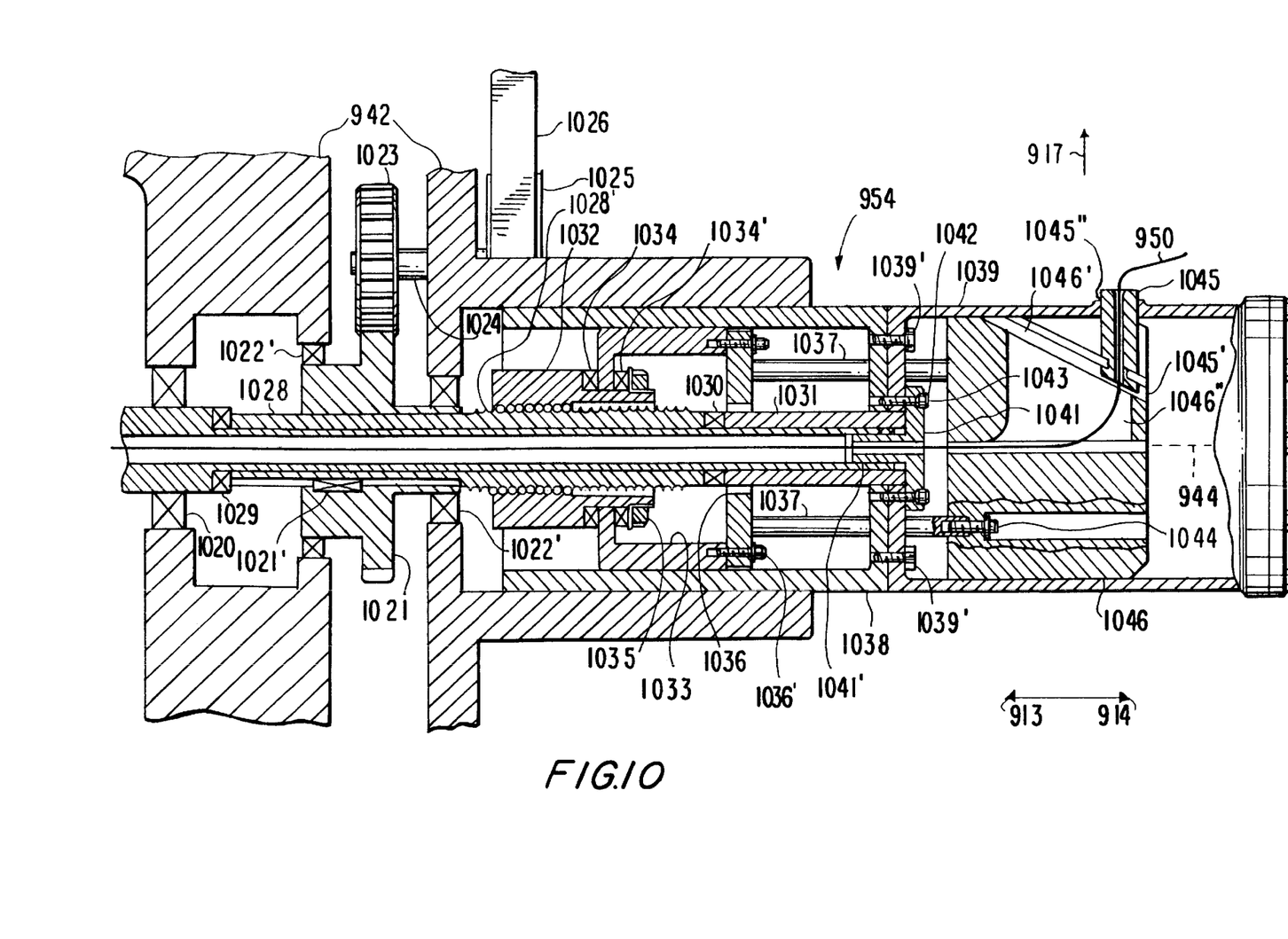
FIG. 10 is a partial sectional view taken from direction 10—10 of FIG. 9 of the winder shown in FIG. 9.

FIGS. 9–11 show another embodiment of the invention. This embodiment also accomplishes the three movements described above by using a needle to dispense the wire. Needle 1045, (see FIGS. 10 and 11), is capable of achieving translation movements (referenced by directions 913 and 914) to move along a side of the pole, rotational movement (referenced by directions 915 and 916) to cross from one side to the other of the pole, and radial—i.e., stratification—movement (referenced by 917).

Needles and apparatuses for accomplishing the translation and rotation movements have been described in commonly-assigned U.S. Pat. Nos. 5,164,772 and 5,413,289. The following describes the implementation of an apparatus that can also provide independent radial movement.

FIG. 9 is an elevational view of a winding machine according to the invention capable of dispensing wires to form the coils of a dynamo-electric component.

FIG. 10 is a partial cross-sectional view taken from direction 10—10 of FIG. 9 of an apparatus for winding wire with the three motions—i.e., translational, rotational and radial—discussed herein (the core has been removed from FIG. 10 for reasons of clarity).

Needle 1045 is preferably an extreme appendage of winding shaft 910. Winding shaft 910 is preferably provided with translation movement and rotation movement such as the winding shaft described in the above-cited patents—e.g., the '289 patent—or in another suitable fashion. The rotation movement may be implemented on the core to be wound, as described above. The wire 950 required to wind the coils preferably passes through winding shaft 910 to reach, and be dispensed by, needle 1045 during winding.

With reference to FIG. 9, winding shaft 910 is driven to move with backwards and forwards translation motions 913, and 914 and oppositely-directed rotation motions 915 and 916 in order to wind coils on dynamo-electric component 940 by an assembly mounted within casing 942. Backwards and forwards translation motions 913 and 914 are parallel to axis 944. Rotation motions 915 and 916 may be performed about center axes 944. Dynamo electric component may also be centered on axis 944.

The radial motion, indicated by motion 917, may preferably be perpendicular to axis 944. The assembly within casing 942 may be totally mechanical with one input rotation motor or provided with independently-controlled motors similar to the assembly described in the '289 patent. In any case, the translation and rotation motions are provided preferably independently of the radial motion, as will be described.

Winding shaft 910 protrudes from two opposite ends 946 and 948 of casing 942. Wires 950 coming from supply drums and tensioners (not shown) enter the winding shaft at end 952, while at the other end 954 of the winding shaft (shown in FIG. 10), needle 1045 is provided for moving with respect to the poles in order to wind the coils.

FIG. 10 illustrates an assembly which has been introduced to cause the radial motion—i.e., stratification motion—in direction 917 of needle 1045. The assembly is mostly contained within cylindrical protrusion 956 of casing 942.

Winding shaft 910 extends to the left of FIG. 10 from bearing support 1020 of casing 942. Bearing support 1020 supports the rotation and translation motions of winding shaft 910 caused by the assembly located to the left, within casing 942, and not shown in FIG. 10.

Gear wheel 1021 is preferably mounted on bearings 1022' and 1022" of casing 942. The center portion of gearwheel 921 is preferably hollow and provided with key 1021'. Winding shaft 910 passes through the hollow center portion of gearwheel 1021. Gear wheel 1021 engages second gear wheel 1023 mounted on axle 1024. Axle 1024 is mounted on a support bearing (not shown) of casing 942. Belt wheel 1025 is mounted on the opposite end of axle 1024. Belt wheel 1025 is driven by belt 1026, which derives motion from the pinion wheel of motor 927 (shown in FIG. 9). Consequently, rotation of the pinion wheel of motor 27 causes gear wheel 1021 to rotate on bearings 1022' and 1022". (It should be noted that motor 927 may be substantially static during translational movement of winding shaft 910.)

Rotation of gear wheel 1021 in a specific direction causes the radial movement 917 of needle 1045, and thereby, to stratifies the wire during winding, as will become more apparent from the following. Drive tube 1028, which serves as a drive member for the radial movements of needle 1045 as will be explained, is preferably hollow so that it can be assembled coaxially on winding shaft 910 and so that it may contain winding shaft 910 and the wire. This assembly may be implemented where winding shaft 910 becomes smaller in its external diameter. Bearings 1029 and 1030 are used to support drive tube 1028 on winding shaft 910, so that drive tube 1028 can rotate around winding shaft 910. However, drive tube 1028 is preferably fixed in directions 913 and 914 along the length of winding shaft 910. Also, portion 1028' of drive tube 1028 preferably has a threaded portion for receiving recirculating balls. Registering cap 1041 has male threaded portion 1041' which engages an internal female threaded portion present in the end of winding shaft 910. By tightening threaded portion 1041', registering cap 1041 pushes on separation tube 1031, which is also mounted coaxially on winding shaft 910.

Consequently, separation tube 1031 restrains bearing 1030. In turn, bearing 1030 restrains drive tube 1028 and pushes it against bearing 1029, which is shouldered by hollow shaft 1021. These restraining and pushing effects are parallel to the extension of winding shaft 910 along center axis 944. In this way, drive tube 1029 is fixed along winding shaft 910 and, therefore, may translate together with winding shaft 910. Nevertheless, drive tube 1028 can be relatively moved—e.g., rotated—with respect to, and preferably around, winding shaft 910, when required, by turning gear wheel 1023 with motor 1027. The configuration between drive tube 1028 and winding tube 910 may preferably be described as a sleeve-thread configuration.

Bearings 1029 and 1030 are preferably implemented such that they act as axial and radial supports for drive tube 1028 on winding shaft 910. Sleeve 1032 is provided with an internal threaded portion for receiving the recirculating balls provided in portion 1028' of drive tube 1028. Rotation of drive tube 1028 relative to winding shaft 910 preferably causes sleeve 1032 to translate parallel to translation directions 913 and 914 depending on the direction of rotation used to rotate drive tube 1028. The recirculating balls preferably provide a low-friction running surface between drive tube 1028 and sleeve 1032 when the rotation and translation occur. Gear wheel 1021 preferably transmits the rotation to drive tube 1028. This rotation allows drive tube 1028 to rotate with respect to winding shaft 910.

Key 1021' of gear wheel 1021 is received in a portion of drive tube 1028. This portion is preferably long enough to allow drive tube 1028 to accomplish translation motions in directions 913 and 914 while still accommodating key 1021'.

First tube 1033 has end portion 1033' assembled between axial bearings 1034 and 1034' so that firs tube 1033 can be moved with sleeve 1032 parallel to translation directions 913 and 914. Ring 1035 is threaded on sleeve 1032 and pushes on bearing 1034' to maintain end portion 1033' between bearing 1034 and 1034'. Disk 1036 is preferably bolted to the opposite end of first tube 1033 by means of bolts 1036'. Disk 1036 carries rods 1037 which extend preferably substantially parallel to winding shaft 910. The central portion of disk 1036 is preferably open to surround winding shaft 910, drive tube 928 and separation tube 1031.

The outside surface of second tube 1038 is preferably supported on the inside cylindrical surface of casing 942 to allow second tube 1038 to accomplish the translational and rotational motions required by the needles, referenced respectively with directions 913, 914 and 915, 916 in FIG. 9. The outside surface of first tube 1033 is supported on the inside cylindrical surface of second tube 1038 to accomplish the movement of the first tube parallel to translation directions 913 and 914.

Support tube 1039 is flanged to second tube 1038 by means of bolts 1039'. In this way, support tube 39 is practically an axial extension of second tube 1038. Consequently, support tube 1039 preferably provides the translational and rotational motions required by the needle. Registering cap 1041 is also provided with referencing pins 1043 which engage in recesses of the end face of winding shaft 910. This engagement of referencing pins 1043, and the joint existing between registering cap 1041 and winding shaft 910, achieved by threaded portion 1041', preferably rigidly connects registering cap 1041 to winding shaft 910. Registering cap 1041 is preferably bolted to second tube 1038 by means of bolts 1042. This preferably rigidly connects second tube 1038 to registering cap 1041 and finally to winding shaft 910. As a result of this connection, winding shaft 910 drives second tube 1038 to accomplish the translational and rotational motions required by the needle or needles.

Consequently, support tube 1039 also accomplish the translational and rotational motions required by the needle or needles.

End member 1046 is bolted to rods 1037 by means of bolts like 1044 (shown in a cut out of member 1046). Portion 1046' of end member 1039 is an inclined way 1046' for receiving slide portion 1045' of a needle 1045. The inclined way preferably has an inclination which converges towards axis 944 in direction 914. The section of the inclined way can have a T form. Consequently slide portion 1045' of needle 1045 should preferably have a corresponding T form. Needle 1045 is preferably hollow for passage of wire 950. Member 1046 is provided with passage 1046" for making wire 950 reach needle 1045. Needle 1045 is supported during stratification movement 917 by the sides of radial bore 1045" present in support tube 1039.

Translation of sleeve 1032, preferably by rotation of motor 927, causes end member 1046 to be translated parallel to directions 913 and 914 because of the connection obtained between first tube 1033 and rods 1037. When end member 1046 translates in direction 914, inclined way 1046' runs on slide portion 1045' of needle 1045. By having inclined way 1046' run on slide portion 1045', stratification movement 917 of needle 1045 is preferably caused. By translating end member 1046 oppositely (in direction 913), needle 1045 preferably accomplishes an opposite movement with respect to 917 in order to bring needle 1045 in a stratification motion towards an innermost position of the stratification movement. Movement of needle 1045 in a direction opposite to direction 917, and therefore, stratification in this opposite direction, may also be accomplished according to the invention.

Motor 1027 is preferably connected to a computer 960 (see FIG. 9) and appropriate drive that may cause the needle to accomplish the stratification motion in a predetermined time relation or position relation with respect to the translation movements and rotation movements accomplished by winding shaft 910.

For example, a certain increment of stratification motion 917 can be accomplished every time winding shaft 910 has completed a sequence of backwards and forwards translational movements and two opposite rotations—i.e., following each completed cycle. This Preferably corresponds to the needles having moved once around a respective coil support (or pole) that they are winding in order to form a turn. An increment of the stratification movement after such a sequence will shift the successive turn preferably along the coil's support. Timing or reaching of predetermined positions by the needle or needles, during the translation and rotation motions can be used to implement preferably incremental stratification movement in direction 917 or in a direction opposite to direction 917.

In FIG. 10, for reason of clarity only one needle 1045 has been shown. However, end member 1046 can have a plurality of inclined ways like 1046'. Each of the ways may be utilized for a respective needle like needle 1045. The inclined ways and the needle should preferably be positioned around axis 944 to be aligned with respective coil supports that may require winding.

In conclusion, winding shaft 910 is able to make the needles accomplish the required translational and rotational motions referenced with directions 913, 914 and 915, 916. At preferably substantially the same time, an assembly has been introduced around, and partially carried by, winding shaft 910 for causing the needles to accomplish stratification motion 917 when required. The assembly preferably produces an axial movement of sleeve 1032 which becomes converted into the stratification motion required by the needles. Furthermore, the axial movement is independently-driven—i.e., by motor 1027 or other suitable device, such as a compressed-air source—with respect to the translational and rotational movements of the needles referenced with directions 913, 914 and 915, 917.

FIG. 11 is a partial view from direction 11—11 of FIG. 9 showing needle 1045 in relation to a pole or coil support 1109' of dynamo electric component 1109 and after a certain number of turns have been wound with wire 950. Stratification motion 917 preferably distributes the turns along coil support 1109' as shown. Without such a stratification motion, the turns may be distributed unevenly and sub-optimally.

Thus, an apparatus for dispensing wire from a needle having a translational, rotational, and radial component is provided. Persons skilled in the art will appreciate that the principles of the present invention can be practiced by other than the described embodiments, which are presented for purposes of illustration and not of limitation, and the present invention is limited only by the claims which follow.

What is claimed is:

1. A winder for winding wires onto a coil support portion of a dynamo-electric core, the winder having a central longitudinal axis, the winder comprising:
   a plurality of needles, each for dispensing a wire;
   a plurality of support members, each member supporting a single one of the plurality of needles;
   a first assembly for producing translational movement of the members along the axis;
   a second assembly for producing relative rotational movement of the plurality of members with respect to the core; and
   a third assembly for producing radial movement of each of the members perpendicular to the axis, and wherein the operation of the third assembly is substantially independent of the operation of the second assembly.

2. The winder of claim 1, the third assembly comprising a motor for producing the radial movement.

3. The winder of claim 2 wherein the motor is substantially static during the translational movement.

4. The winder of claim 1 further comprising a plate that fixedly supports the plurality of members.

5. The winder of claim 4, wherein the first assembly provides translational movement to the plate.

6. The winder of claim 4 wherein the plate comprises an aperture to allow the radial movement of the tubes.

7. The winder of claim 1, each of the plurality of support members comprising a support tube.

8. The winder of claim 1 wherein the translation movement and radial movement of the plurality of support members is programmable.

9. The winder of claim 1 wherein the third assembly produces incremental radial movement of each of the plurality of support members.

10. The winder of claim 1 wherein the third assembly produces bi-directional radial movement of each of the plurality of support tubes perpendicular to the axis.

11. The winder of claim 1 wherein the third assembly produces radial movement of each of the tubes substantially simultaneously.

12. The winder of claim 1 further comprising a plurality of support arms, wherein each of the plurality of support arms fixedly supports the support members and each of the plurality of support arms defines a different plane, each of said planes being parallel to one another and perpendicular to the axis.

13. The winder of claim 1 wherein the operation of the third assembly is substantially independent of the operation of the first assembly.

14. A winder for winding a wire onto a coil support portion of a dynamo-electric core, the winder having a central longitudinal axis, the winder comprising:
   a needle for dispensing the wire;
   a first assembly, the first assembly comprising a winding shaft, the needle being constrained to move translationally with the shaft, the first assembly being for producing translational movement of the shaft along the axis;
   a second assembly for producing rotational movement of the needle about the axis;
   a third assembly comprising a drive member movably coupled to the winding shaft wherein relative rotation between the drive member and the winding shaft produces radial movement of the needle, and wherein the operation of the third assembly produces radial movement substantially independently of rotational movement of the second assembly; and
   a plurality of the needles.

15. The winder of claim 14 wherein the third assembly produces radial movement of each of the plurality of needles substantially simultaneously.

16. The winder of claim 14 wherein the third assembly comprises a motor for producing the radial movement.

17. The winder of claim 14 wherein the motor is substantially static during the translational movement.

18. The winder of claim 14 wherein the drive member comprises a drive tube.

19. The winder of claim 14 wherein the translation movement and radial movement of the needle is programmable.

20. The winder of claim 14 wherein the third assembly produces incremental radial movement of the needle.

21. The winder of claim 14 wherein the third assembly produces bi-directional radial movement the needle.

22. The winder of claim 14 wherein the drive member is coupled in a sleeve-thread configuration with the winding shaft.

23. The winder of claim 14 wherein the radial movement is substantially independent of the translational movement.

24. The winder of claim 14 wherein the drive member is coaxial with the winding shaft.

25. The winder of claim 14 wherein the drive member substantially surrounds the winding shaft.

26. A method of winding a wire onto a coil support portion of a dynamo-electric core using a winder having a central longitudinal axis, a winding shaft and a drive tube, the method comprising:
   winding the wire along the coil support in a first direction, the first direction being parallel to the axis;
   winding the wire across a face of the coil support in a first rotational direction about the axis;
   winding the wire in a second direction along the coil support, the second direction being opposite the first direction;
   winding the wire across a second face of the coil support in a second rotational direction about the axis, the second rotational direction being opposite the first rotational direction;
   relatively moving the winding shaft with respect to the drive tube in order to independently stratify the wire in a radial direction perpendicular to the axis along the coil support; and
   winding a plurality of wires simultaneously.

27. The method of claim 26 wherein the relatively rotating comprises stratifying the wire independently of the winding in the first direction and the winding in the second direction.

28. The method of claim 26 wherein the relatively rotating comprises stratifying the wire independently of the winding in the first rotational direction and the winding in the second rotational direction.

29. The method of claim 26 further comprising programming the location and duration of each of the winding and the stratifying using a computer.

30. The method of claim 26 wherein the winding of the wire in the first direction and the winding of the wire in the second direction occur without moving a motor used to independently stratify the wire.

31. The method of claim 26 wherein the relatively moving the winding shaft with respect to the driving tube comprises relatively rotating the winding shaft with respect to the driving tube.

* * * * *